United States Patent [19]
Angersbach et al.

[11] 3,995,156
[45] Nov. 30, 1976

[54] TRANSMITTER FOR GOVERNED-SPEED DRIVES EMPLOYING AN OPTICAL GRATING AND PHOTOCELLS AT AN ANGLE THERETO

[75] Inventors: Wolfgang Angersbach, Darmstadt; Karl-Heinz Meier, Zeilhard, both of Germany

[73] Assignee: Quick-Rotan Becker & Notz KG, Germany

[22] Filed: Mar. 25, 1975

[21] Appl. No.: 561,990

[52] U.S. Cl. .................. 250/237 G; 250/231 SE; 324/175; 356/169
[51] Int. Cl.² ........................................... H01J 3/14
[58] Field of Search .......... 250/231 SE, 233, 237 G; 356/169, 170; 324/175

[56] References Cited
UNITED STATES PATENTS

| | | |
|---|---|---|
| 3,187,187 | 6/1965 | Wingate ..................... 250/231 SE |
| 3,309,525 | 3/1967 | Johnson, Jr. ................. 250/231 SE |
| 3,454,777 | 7/1969 | Marcus ....................... 250/237 G |
| 3,723,748 | 3/1973 | Coburn et al. ................ 250/233 |

*Primary Examiner*—David C. Nelms
*Attorney, Agent, or Firm*—Lane, Aitken, Dunner & Ziems

[57] ABSTRACT

A transmitter for determining the speed of rotation and the angular position of a rotating member, such as a shaft, in which a coding disc is driven synchronously with the shaft and has a series of circularly distributed light and dark areas which cooperate with two sections of alternating light and dark areas formed by a coding segment which is fixed relative to the disc. The pitch of the light and dark areas of the coding segment is equal to the pitch of the light and dark areas of the coding disc, respectively, and the light and dark areas of one section of the coding segment are staggered relative to the light and dark areas of the other section thereof. A light is passed towards the coding disc and the coding segment and at least one photosensitive receiver is in the path of the light passing through the light areas for generating an output signal.

13 Claims, 8 Drawing Figures

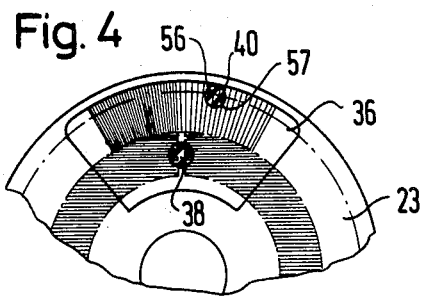
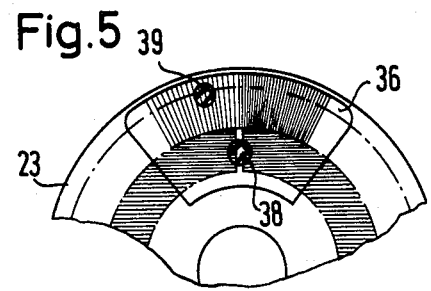
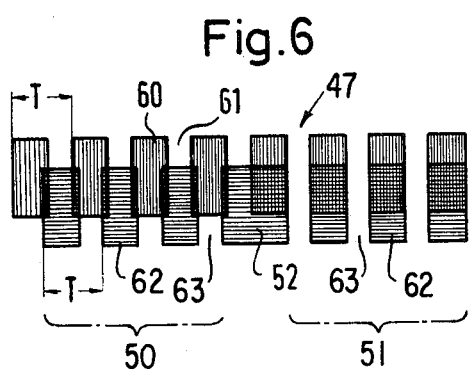
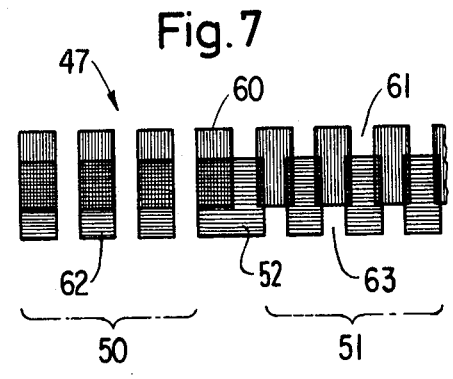
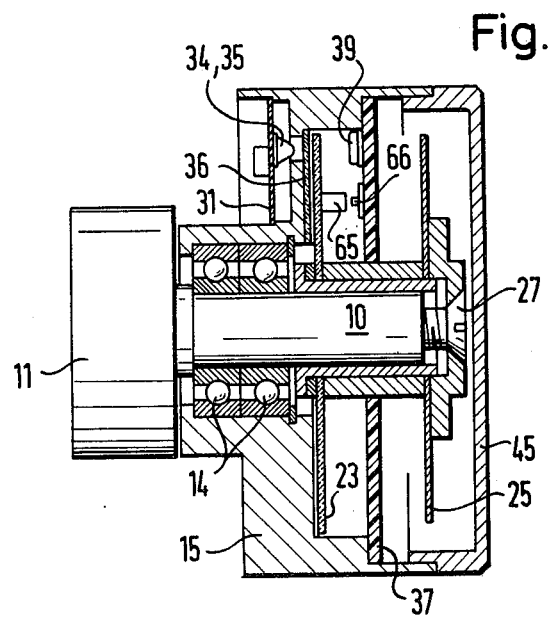

TRANSMITTER FOR GOVERNED-SPEED DRIVES EMPLOYING AN OPTICAL GRATING AND PHOTOCELLS AT AN ANGLE THERETO

BACKGROUND OF THE INVENTION

This invention relates to a transmitter for determining the speed and angular position of a rotating shaft, such as those employed in sewing technology, and more particularly, to such a transmitter employing a coded disc driven synchronously with a working shaft and having a series of circularly distributed light and dark areas, and a stator cooperating with same and including a luminous emitter and a photosensitive receiver.

In British Pat. No. 102653 a transmitter is disclosed in which the receiver supplies a signal in which the momentary amplitude depends on whether a light or dark area of the coding disc happens to be positioned in the path of the beam between the emitter and the receiver. This alternating voltage signal drives a discriminator which delivers a direct voltage signal which, for its part, is a function of the frequency of the alternating voltage signal of the receiver. The direct voltage signal thus obtained is compared to a direct datum voltage representing the nominal speed value. The clutch or brake of the clutch motor are actuated as a function of the differential signal generated on the basis of this comparison. The light-dark control of the receiver by the light and dark areas of the coding disc occurs perfectly in this known system only as long as the width of the receiver measured in the direction of displacement of the coding disc is equal to or smaller than the halving division of the coding disc, i.e., in the case of identical widths for the light and dark areas, equal to or smaller than the width of a light area or dark area. However, snce photosensitive receivers require an appreciable width of photosensitive surface in order to obtain a signal of adequate strength for further processing, the known system allows a relatively coarse graduation only. This means that the diameter of the coding disc becomes undesirably large or that the number of pulses obtained for each complete revolution of the coding disc becomes relatively small. If the receiver is wider than half the width of graduation, parts of the receiver surface are always situated opposite one or more dark areas and other parts of the receiver surface are always situated opposite one or more light areas, which reduces the signal amplitude. The effective signal of the receiver diminishes as the width of the receiver is increased in relation to the graduation of the coding disc. Moreover, the system has the disadvantage that the effective signal goes down to zero if the width of the receiver is equal to an integral multiple of the semi-graduation. This means that when a coding disc is replaced by a coding disc having a different graduation, the photosensitive receiver must also be replaced by a receiver of different width if appropriate, to obtain an effective signal.

In order to solve these problems, a transmitter of the above type should provide an effective signal allowing an unobjectionable evaluation even in the case of a coding disc having a small diameter and/or narrow coding disc graduation. It should be possible to make use of relatively wide and thus powerful photosensitive receivers for optionally narrowly spaced graduations of the coding disc. The effective signal obtained should be substantially unaffected by the ratio between the division of the coding disc and the width of the receiver.

SUMMARY OF THE INVENTION

In accordance with the present invention, a coding segment is provided in the transmitter housing which comprises two ranges of light-dark areas, the graduations of which are equal in each case to the graduation of the light-dark areas of the coding disc and which are staggered by half a graduation with respect to each other. The coding segment is complementarily situated in the beam path between the emitter and receiver, and each of the two ranges of light and dark areas of the coding segment has a coordinated photosensitive receiver associated therewith.

It can easily be shown that, in a system of this nature, the output signal of both receivers always fluctuates between a pronounced minimum value and a pronouced maximum value. The receiver coordinated with the one range of light and dark areas always reaches its maximum value when the output signal of the receiver coordinated with the other range or row of light and dark areas passes through its minimum value. This offers the possibility of evaluating the output signals of the two receivers via a different stage. The reliability of evaluation is increased substantially as compared to known systems. The evaluation signal may be subjected to further processing without any problems and with circuitry of particularly low complexity.

In principle, a single light source may be jointly coordinated with the receivers. To obtain relatively closely set beams however, and in order to prevent the receivers being deleteriously affected by random light, each of the two photosensitive receivers has preferably coordinated with it a separate luminous emitter, appropriately in the form of a luminescence diode.

In a further embodiment of the invention, the dark areas of the coding disc and/or of the coding segment are wider than the interposed light areas. This ensures total occultation of the beams even with allowance for particular tolerances for the delimitations of the light and dark areas, without appreciably affecting the magnitude of the maximum value signal of the receiver.

The width of the photosensitive area of the receivers in the direction of displacement of the coding disc is preferably at least equal to the division of the light and dark areas. It is accomplished thereby that the output signals of the receivers become independent of the orientation of the receivers with respect to the ranges of light and dark areas of the coding segment. A precise mutual adjustment becomes unnecessary.

It is appropriate moreover for the photosensitive area of the receivers to be formed substantially rectangularly, and to ensure that their longitudinal aixs of symmetry subtends an angle of approximately 45° with the corresponding radius of the coding disc.

The receivers may comprise two or more photoelectric cells connected in parallel, which are situated under a common lens and are approperiately connected in parallel for evaluation purposes.

A third or additional pair or pairs of luminous emitters and receivers are preferably incorporated, cooperating with one or more individual markings of the coding disc, which are situated on one or more radii of the coding disc differing from the radius of the sequence of light and dark areas. This renders it possible to make use of the actual value transmitter not only for determination of the r.p.m., but instead of this or complementarily thereto, for determining the angular position of the working shaft. A single marking of a single light area is appropriately formed by a dark ring which is closed moreover.

Instead of utilizing one or more complementary pairs of light emitters and receivers for angle measurement purposes, at least one magnet, which preferably consists of a permanent magnet, may also be incorporated in further embodiment of the invention, which revolves together with the coding disc and cooperates with a Hall generator installed in unit with the housing. The combination of an opto-electronic r.p.m. measurement system with an angular measurement system making use of a magnet carried past Hall generators, is particularly reliable and uncomplicated; and permits very precise positioning.

The coding disc and/or the coding segment may appropriately consist of photographically imprinted acrylic glass. In accordance with a modified form of embodiment, they may also be formed by a copper layer from which light areas are etched out.

BRIEF DESCRIPTION OF THE DRAWINGS

The invention will now be described by way of example with reference to the accompanying drawings in which:

FIG. 4 shows a partial view of the coding disc and of the coding segment in a particular angular position of the coding disc;

FIG. 5 shows a partial view analogous to FIG. 4, in which the coding disc has been moved by a distance corresponding to half a graduation, with respect to the coding segment;

FIG. 6 shows a considerably enlarged diagrammatical illustration of the mutual coverage of the sequence of the light and dark areas of the coding disc and coding segment for the position according to FIG. 4;

FIG. 7 shows a diagrammatic illustration corresponding to FIG. 6, for the position according to FIG. 5, and FIG. 8 shows an axial cross-section through a transmitter in accordance with a modified second form of embodiment.

DESCRIPTION OF THE PREFERRED EMBODIMENTS

Figure 1:
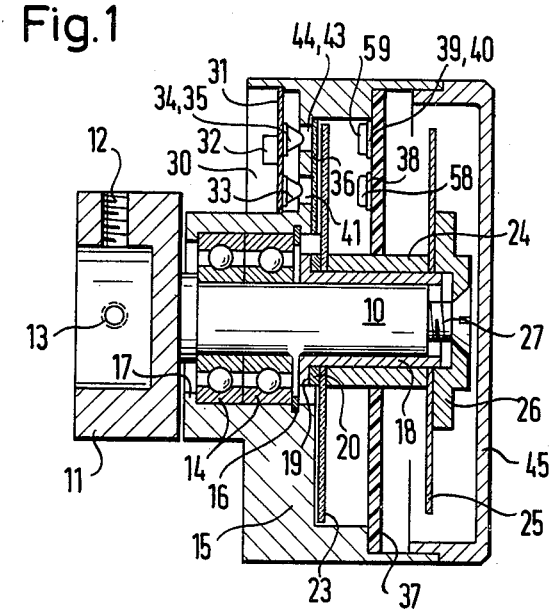
FIG. 1 shows an axial cross-section through a first embodiment of a transmitter in accordance with the invention.

The transmitter according to FIG. 1 comprises a stub shaft 10 which is enlarged into a receiving portion 11 at its extremity which is shown at the left in FIG. 1. The receiving portion 11 may be pushed on to one extremity of a working shaft, which is not illustrated, and may be joined to the same by means of set screws which are screwed into tapped bores 12, 13 of the receiving portion. Two ball-bearings 14 are drawn on to the stub shaft 10, whereby the shaft is rotatably journalled in a housing 15. A locating ring 16 secures the housing in the axial direction with respect to the shaft 10, in conjunction with a shoulder 17 of the housing 15. A flanged sleeve 18 which is joined to the shaft 10 in a force-locked manner, e.g. in a press fit, is situated on the other extermity of the stub shaft 10 opposed to that of the receiving portion 11. A coding disc 23 which is preferably produced from acrylic glass and is connected to an entraining sleeve 24, for example by pins, bears via a washer 20 against the side of the flange 19 of the flange's sleeve 18 which is at the right in FIG. 1. An adjusting plate 25 is connected to the outer extremity of the entraining sleeve 24, for example by means of pins. A thrust plate 26 which may be pressed against the adjusting plate 25 by means of a clamping screw 27 screwed into the end of the shaft 10, bears against the outer surface of the adjusting plate 25.

The end of the housing 15 is provided with a recess 30 in which a conductor plate 31 extends. The conductor plate 31 is releasably connected to the housing 15 by means of a screw 32. At a first radial distance from the axis of the stub shaft a light-emitting diode 33 is attached to the plate 31 and, at a second radial distance from the axis of the shaft 10, two additional light-emitting diodes 34, 35 are attached to the plate 31 and are staggered with respect to each other in the peripheral direction, whereof only one is apparent from FIG. 1. The diodes act as infrared emitters. A coding segment 36 which is preferably also made of acrylic glass is situated on the inner surface of the end side of the housing 15 in the area of the recess 30.

A second conductor plate 37 carries three photosensitive receivers 38, 39, 40, each of these being in axial alignment in each case with one of the luminescence diodes 33, 34, 35 and openings 41, 43, and 44 of the end side of the housing 15 which are coordinated with these diodes. The housing 15 is closed by a cover 45.

Figure 2:
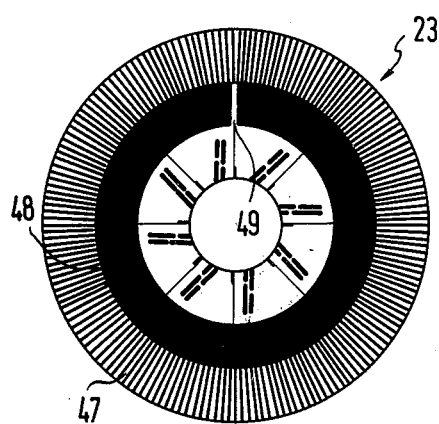
FIG. 2 shows a plan view of a coding disc of the transmitter according to FIG. 1.

As apparent in particular from FIG. 2, the coding disc 23 acting as a shutter is equipped with a series of light and dark areas in its radially outwardly situated area 47. The radially inwardly adjacent annular area 48 is dark throughout its greater portion and has a single light area 49.

Figure 3:
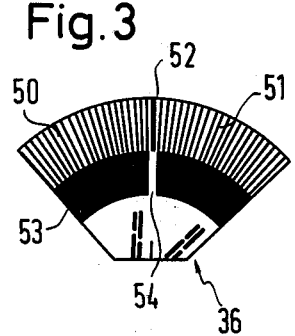
FIG. 3 shows a plan view of the coding segment of the transmitter according to FIG. 1.

The coding segment 36 acting as a screen, is illustrated in particular in FIG. 3, and comprises a first section 50 of light and dark areas and a second section 51 of light and dark areas, with the section being separated from each other by means of a wider dark area 52. Radially inwardly from the sections 50, 51 is situated a dark area 53 which is interrupted by a single light area 54. The light area 54 is radially aligned with the dark area 52 and confronts the light area 49 in the assembled condition.

The light and dark areas of the coding disc and coding segment are preferably applied by photogravure.

As apparent from FIGS. 4 and 5, the receivers each comprise two photoelectric cells with rectangular photosensitive surfaces 56 and 57. The longitudinal axis of symmetry of the surfaces 56, 57 substends an angle of approximately 45° with the corresponding radius. The surfaces 56, 57 are situated beneath a common lens which is shown at 58 and 59 in FIG. 1, for the receivers 38, 39.

When the working shaft turns, it entrains the stub shaft 10 of the transmitter via the receiving portion 11 and causes the coding disc 23 to revolve. The light and dark areas of the coding disc alternately pass the light and dark areas of the coding segment 36 in the beam path between the diodes 33 to 35 and the photosensitive receivers 38 to 40, respectively.

In the greatly enlarged diagrammatical illustration according to FIGS. 6 and 7, the radius of the coding disc and of the coding segment has been assumed to be infinite, to simplify matters. Moreover, the light and dark areas of the coding disc are shown offset at right angles to their direction of displacement with respect to the light and dark areas of the coding segment, in order to demonstrate the cooperation of the coding disc and coding segment even more clearly.

The width of a pair of light and dark areas will be referred to as the pitch T. The pitch of the coding disc and of the coding segment is the same and the dark areas are slightly wider than the light areas. In the form of the embodiment illustrated, the width of a dark area 60 of the coding disc is equal to 0.6T for example, and the width of a light area 61 of the coding disc is equal to 0.4T. The width of the dark area 52 of the coding segment is so selected that the series of dark areas 62 and light areas 63 in the section 50 of the coding segment is staggered by the amount T/2 in the direction of displacement of the coding disc with respect to the series of the dark areas 62 and light areas 63 in the section 51 of the coding segment.

In the case of the relative position of the coding disc 23 and coding segment 36 depicted in FIGS. 4 and 6, the dark areas 60 of the coding disc 23 overlap the light areas 63 of the coding segment 36 at the side of the section 50 of the coding segment so that the beam path between the luminescence diode 34 and the receiver 39 is obscured. By constrast, the dark areas 60 of the coding disc 23 and the dark areas 62 of the coding segment 36 are aligned with each other at the side of the section 51 of the the coding segment. As a result, a maximum amount of light energy impinges on the receiver 40.

FIGS. 5 and 7 demonstrate the conditions which result when the cooling disc 23 has moved onward by a distance corresponding to T/2 with respect to the coding segment 36. In this case, the dark areas 60 and 62 of the coding disc 23 and the coding segment 36, respectively, are aligned with each other at the side of the section 50 of the coating segment, whereas the dark areas 60 of the coding disc overlap the light areas 63 of the coding segment at the side of the section 51 of the coding segment. Consequently, a maximum of light energy is incident upon the receiver 39, whereas the receiver 40 is acted upon by a minimum of light energy.

This changeover is repeated upon further rotation of the coding disc 23. The output signal of the receiver 39 reaches its maximum value in each case, whilst the output signal of the receiver 40 passes through a minimum value, and vice versa. If the output terminals of the receivers 39, 40 are connected to a differential amplifier, a pronounced evaluating signal is obtained which may be subjected to further processing in a reliable manner, with apparatus of little complexity. The differential amplifier may be directly on the conductor plate 37, if appropriate together with any other electronic components of the evaluation circuit.

The conditions described in the foregoing are obtained notwithstanding the manner in which the individual emitters and receivers are aligned in the direction of displacement of the coding disc 23 with respect to the stationary coding segment 36. This means that a costly adjustment of the coding segment 36 with respect to the receivers and emitters is not necessary.

In conjunction with the light area 54, the light area 49 allows light to reach the photosensitive receiver 38 briefly from the luminescence diode 33, once in every complete revolution of the coding disc 23. Consequently, the receiver 38 generates one pulse per revolution of the coding disc 23.

Use may be made of the transmitter described, in order to determine the actual value of the speed rotation as well as the actual value of the angular position of the coding disc and thus of the working shaft. Appropriate evaluation circuits are available to one versed in the art and consequently do not require more detailed description at this juncture. For example, the number of output pulses of the receivers 39, 40 or of the differential circuit connected to these receivers, which occur per unit of time, may be used to determine the speed in revolution per minute. The actual value of the angular position may be determined in analog as well as digital manner, by the application of the transmitter described. For the purpose of analog determination of the angular position, use need merely be made of the light area 49 of the annular portion 48 of the coding disc 23, for example. If, after loosening the clamping screw 27, the coding disc 23 is so adjusted by means of the adjusting plate 25 that the light area 49 corresponds to a particular positon of the working shaft, for example to the "needle up" or "needle down" position in the case of a sewing machine positioning drive, the receiver 38 generates a pulse every time this position is reached.

The evaluation system may, however, also be arranged for the purpose of determining the actual value of the angular position. In this case, the pulses attributable to the light and dark areas of the portions 47 of the coding disc 23 are counted by means of a counter, and the counter is resetted on the basis of the pulse generated by the light area 49 traversing the beam path between the luminescence diode 33 and the receiver 38.

Numerous modifications are possible within the scope of the invention. For example, a light area of corresponding width may also be incorporated for separation of the two sections 50 and 51 of light and dark areas of the coding segment 36, instead of a dark area 52. The area of separation may also be wider than illustrated. The sole essential condition is that the displacement T/2 between the series of light and dark areas in the sections 50 and the series of light and dark areas in the section 51 should be maintained. The number of light and dark areas in the portion 47 of the coding disc 23 may be adapted to the prevailing requirements. Complementarily to the annular portion 48, one or more additional annular portions comprising a single light area in each case may be incorporated to allow a fixed presetting of particular angular positions. A single dark area may be present instead of a single light area, and the portion 48 may moreover be arranged as an uninterrupted light area.

In the modified form of embodiment according to FIG. 8, the photoemitter 32 and the receiver 33 used to measure the angle of rotation is replaced by a permanent magnet 65 fastened on the coding disc 23 and magnetized parallel to the axis of the stub shaft 10, and by a Hall generator 66 which is situated on the conductor plate 37 at the same radial spacing from the stub shaft axis. Accordingly, this eliminates the light and dark portions 48, 49 and the light and dark areas 53, 54 of the coding disc 23 and coding segment 36, respectively, both moreover being arranged in the same manner as described in the foregoing with reference to FIGS. 2 to 7. When the coding disc 23 rotates, and the permanent magent 65 consequently revolves around the stub shaft axis, the Hall generator 66 delivers a voltage pulse each time the permanent magnet 65 passes before it. In this case too, the coding disc 23 may be so adjusted by means of the adjusting plate 25 after loosening the clamping screw 27, that the switch-off signal produced by the Hall generator 66 occurs at the required angular position of the working shaft.

If desirable, the permanent magnet 65 may also be situated on a carrier separate from the coding disc 23. Two or more permanent magnets may be incorporated moreover which cooperate with one or more Hall generators in the manner disclosed in British Pat. No. 1,274,308.

A high degree of revolution of 200 to 300 pulses per revolution may be obtained without difficulty, for a compact overall diameter of the transmitter described. A stable governing action thereby also becomes possible even at working shaft speeds of revolution of 50 r.p.m. and less. An angular measurement to within approximately 1° may be performed precisely by counting the pulses subjected to immediate further processing and not requiring conversion. On the whole, the transmitter of the present invention is no more expensive than the synchronisers now utilized in sewing technology in particular.

We claim:

1. A transmitter for governed-speed drive systems, comprising a drive shaft, a coding disc driven synchronously with said shaft and having a series of circularly distributed light and dark areas, a coding segment disposed adjacent said coding disc and consisting of two sections of alternating light and dark areas, the pitch of which is equal to the pitch of said light and dark areas of said coding disc, respectively, the light and dark areas of one section of said coding segment being staggered relative to the light and dark areas of the other section thereof, means for passing a light towards said disc and said segment, and at least one photosensitive cell disposed in the path of the light passing through said light areas for generating an output signal, the photosensitive surface of said cell being substantially rectangular, with its longitudinal axis of symmetry subtending an angle of approximately 45° with respect to the corresponding radius of said coding disc.

2. A transmitter according to claim 1 wherein there is a photosensitive receiver means associated with each of said sections of said coding segment.

3. A transmitter according to claim 2, in which said light passing means comprises a photo-emissive emitter coordinated with each of said photosensitive receiver means.

4. A transmitter according to claim 1 in which said light passing means comprises a photo-emissive emitter.

5. A transmitter according to claim 1, in which the dark areas of the coding disc and/or of the coding segment are wider than their respective light areas.

6. A transmitter according to claim 1 in which the width of said receiver means is at least equal to the pitch of the light and dark areas of the coding disc in the direction of displacement of the coding disc.

7. A transmitter according to claim 1 in which said receiver means comprise two or more photoelectric cells connected in parallel and situated beneath a common lens.

8. A transmitter according to claim 1 in which said light passing means comprises at least one light-emitting diode.

9. A transmitter according to claim 1 in which said coding disc has additional markings radially displaced from its series of light and dark areas, and further comprising means for passing a beam of light towards said markings, and photosensitive receiver means in the path of the light passing through said markings for generating an output signal.

10. A transmitter according to claim 9 in which said markings consist of a single light area within a dark ring which is otherwise uninterrupted.

11. A transmitter according to claim 1 comprising at least one magnet which revolves with the coding disc and means for generating an output signal in response to the relative position of said magnet.

12. A transmitter according to claim 1 in which the coding disc and the coding segment are formed by acrylic glass imprinted by photogravure.

13. A transmitter according to claim 1 in which the coding disc and the coding segment are formed by a copper layer from which light areas are etched out.

* * * * *